(12) United States Patent
Nakamura et al.

(10) Patent No.: US 6,820,137 B2
(45) Date of Patent: Nov. 16, 2004

(54) COMPUTER-READABLE RECORDING MEDIUM STORING RESOLUTION CONVERTING PROGRAM, RESOLUTION CONVERTING DEVICE AND RESOLUTION CONVERTING METHOD

(75) Inventors: Kyoko Nakamura, Toyonaka (JP); Hiromu Hasegawa, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 239 days.

(21) Appl. No.: 09/989,653

(22) Filed: Nov. 21, 2001

(65) Prior Publication Data

US 2002/0114534 A1 Aug. 22, 2002

(30) Foreign Application Priority Data

Dec. 4, 2000 (JP) ........................................ 2000-368842

(51) Int. Cl.[7] .............................. G06F 3/00; G06K 9/40; G06K 9/46; G06K 9/36
(52) U.S. Cl. ................................ 710/1; 710/2; 382/203; 382/227; 382/274; 382/276; 345/419; 345/698
(58) Field of Search ........................ 710/1, 2; 345/419, 345/698; 382/203, 227, 274, 276, 243

(56) References Cited

U.S. PATENT DOCUMENTS 6,020,892 A  * 2/2000 Dillon ......................... 345/419
2004/0041804 A1 * 3/2004 Ives et al. ................... 345/419

FOREIGN PATENT DOCUMENTS

JP                11213139 A   * 8/1999

* cited by examiner

Primary Examiner—Tammara Peyton
(74) Attorney, Agent, or Firm—Morrison & Foerster LLP

(57) ABSTRACT

A resolution converting method, device, and computer-readable recording medium that can improve the quality of a resolution-converted image. The invention converts resolution based on a model generated through statistical processing of multiple images by preparing multiple models having different resolutions, receiving an input image, projecting the input image onto a model to obtain characteristic parameters of the input image, and generating an image by applying the obtained characteristic parameters to a model. Using the characteristic parameters thereby obtained, an image is generated using a model different from the model used to obtain the characteristic parameters. Consequently, the invention is capable of improving the quality of the resolution-converted image.

21 Claims, 5 Drawing Sheets

COMPUTER-READABLE RECORDING MEDIUM STORING RESOLUTION CONVERTING PROGRAM, RESOLUTION CONVERTING DEVICE AND RESOLUTION CONVERTING METHOD

RELATED APPLICATIONS

This application is based on application No. 2000-368842 filed in Japan, the contents of which are hereby incorporated by reference.

FIELD OF THE INVENTION

The present invention relates to a computer-readable recording medium storing a resolution converting program, a resolution converting device and a resolution converting method, and more particularly to a computer-readable recording medium storing a resolution converting program that converts resolution based on a model generated through statistical processing of multiple images, as well as a resolution converting device and a resolution converting method.

DESCRIPTION OF THE RELATED ART

In the conventional art, when image data is transmitted from one device to another, if the resolution of images that can be processed by the latter device is different from the resolution of images generated by the former device, it is necessary to convert the resolution. In such a case, the resolution is converted by performing interpolation such as linear or tertiary interpolation regarding the image data.

Japanese Laid-Open Patent Application Hei 7-152907 discloses, as another method of resolution conversion, a method in which the wavelet component of the input image is predicted, and compensation is made for the high frequency component of an enlarged image with a higher resolution.

However, where interpolation such as linear or tertiary interpolation is performed regarding an image, because only the resolution of the image before enlargement or the resolution of the image that has undergone smoothing but not enlargement is available, the problem exists that the contours of the enlarged image are blurry or exhibit noticeable roughness.

According to the method disclosed by Japanese Laid-Open Patent Application Hei 7-152907, it is necessary to predict the wavelet component for a higher resolution image. When predicting the wavelet component, the results of a prescribed learning process must be used, giving rise to the problem that the results of the learning process affect image quality.

SUMMARY OF THE INVENTION

The present invention was created in order to resolve these problems, and an aspect thereof is to provide a computer-readable recording medium storing a resolution converting program, a resolution converting device and a resolution converting method that can improve the quality of the resolution-converted image.

Another aspect of the present invention is to provide a computer-readable recording medium storing a resolution converting program, a resolution converting device and a resolution converting method that can easily convert the resolution of an image.

According to one embodiment of the present invention, the present invention comprises a computer-readable recording medium storing a resolution converting program that converts resolution based on a model generated through statistical processing of multiple images, wherein the program is implemented using a computer and includes: a step for preparing multiple models having different resolutions; a step for receiving an input image; a step for detecting the resolution of the input image; a step for projecting the input image onto a model selected in accordance with the detected resolution in order to obtain characteristic parameters of the input image; and a step for generating an image by applying the obtained characteristic parameters to a model different from the model used to obtain the characteristic parameters.

According to this embodiment, multiple models having different resolutions are prepared. The input image is projected onto a model corresponding to the resolution of the input image, and the characteristic parameters of the input image are obtained. Using the characteristic parameters thereby obtained, an image is generated using a model different from the model used to obtain the characteristic parameters. Consequently, a computer-readable recording medium storing a resolution converting program capable of improving the quality of the resolution-converted image can be provided.

Preferably, the step for preparing multiple models having different resolutions has a step for converting the resolution of a model generated through statistical processing.

According to this embodiment, the multiple models having different resolutions are generated by converting the resolution of a model generated through statistical processing. Among the models having different resolutions, the images generated based on the same characteristic parameters differ from each other only in terms of resolution. Therefore, because multiple resolution-converted models may be obtained from one model, a computer-readable recording medium storing a resolution converting program that can easily change the resolution of an image can be provided.

Preferably, the step for preparing multiple models having different resolutions has a step for converting the resolutions of multiple images and generating a model by performing statistical processing regarding each image having a different resolution.

According to this embodiment, the multiple models having different resolutions are generated by converting the resolution of each of the multiple images and performing statistical processing regarding each image having a different resolution. Therefore, because multiple models having different resolutions and generated from multiple images are used, a computer-readable recording medium storing a resolution converting program that can easily change the resolution of an image can be provided.

Preferably, the image generation step generates an image using a model having a higher resolution than the detected resolution.

According to this invention, because an image is generated based on a model having a higher resolution than the detected resolution, the quality of the image can be improved when the resolution thereof is increased.

Preferably, the multiple images are images of a person's face.

According to this invention, because the multiple images are images of a person's face, the quality of the resolution-converted image of a face can be improved.

Preferably, a step for extracting the face area from the input image, a step for converting the resolution of the input image, and a step for synthesizing the resolution-converted image and the image generated in the image generation step are further included.

According to this invention, the face area is extracted from the input image and the resolution of the input image is converted. The resolution-changed image and the image generated through the image generation step are then synthesized. Therefore, where a person's face is included in the input image, the quality of the image of the person's face may be improved.

According to another aspect of the present invention, the resolution converting device includes means for preparing multiple models having different resolutions; means for receiving an input image; means for detecting the resolution of said input image; means for projecting said input image onto a model selected in accordance with said detected resolution in order to obtain characteristic parameters of said input image; and means for generating an image by applying said obtained characteristic parameters to a model different from said model used to obtain the characteristic parameters.

According to this invention, multiple models having different resolutions are prepared. The input image is projected onto a model corresponding to the resolution of the input image, and the characteristic parameters of the input image are obtained. Using the thus obtained characteristic parameters, an image is generated based on a model different from the model used to obtain the characteristic parameters. Therefore, a resolution converting device that can improve the quality of the resolution-converted image can be provided.

According to yet another aspect of the present invention, the present invention comprises a resolution converting method that converts resolution using a model generated through statistical processing of multiple images and includes a step for preparing multiple models having different resolutions; a step for receiving an input image; a step for detecting the resolution of said input image; a step for projecting said input image onto a model selected in accordance with said detected resolution in order to obtain characteristic parameters of said input image; and a step for generating an image by applying said obtained characteristic parameters to a model different from said model used to obtain the characteristic parameters.

According to this invention, multiple models having different resolutions are prepared. The input image is projected onto a model corresponding to the resolution of the input image, and the characteristic parameters of the input image are obtained. Using the thus obtained characteristic parameters, an image is generated based on a model different from the model used to obtain the characteristic parameters. Therefore, a resolution converting method that can improve the quality of the resolution-converted image can be provided.

DESCRIPTION OF THE PREFERRED EMBODIMENTS

Figure 1:
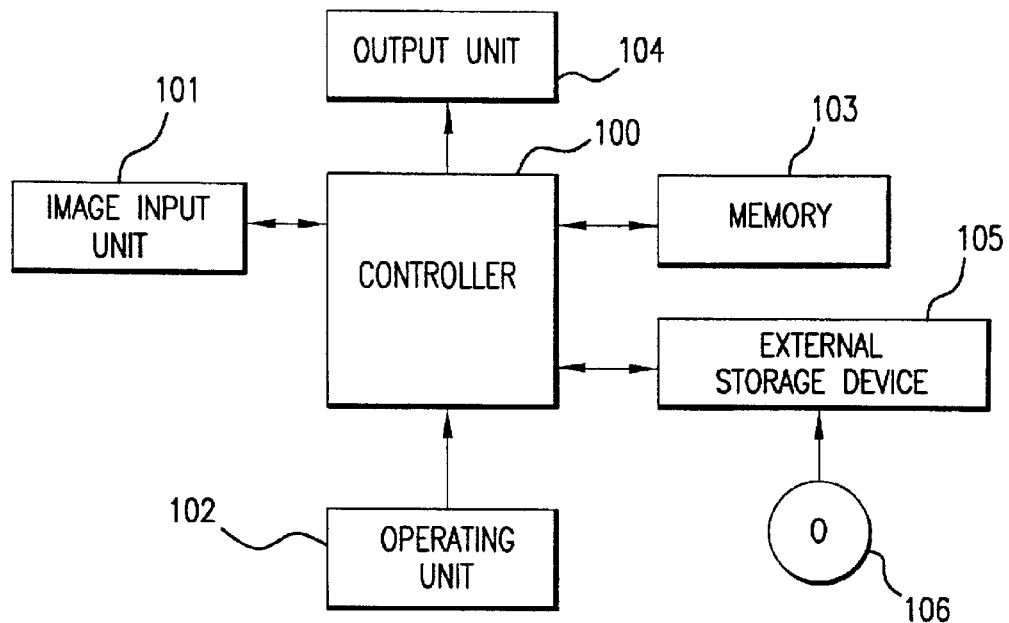
FIG. 1 is a block diagram showing the hardware construction of the resolution converting device comprising one embodiment.

An embodiment of the present invention is explained below with reference to the drawings. Identical numbers indicate identical or equivalent members in the drawings, and explanations of such members will not be repeated.

FIG. 1 is a block diagram showing the hardware construction of the resolution converting device comprising one embodiment of the present invention. With reference to FIG. 1, the resolution converting device includes a controller 100, an image input unit 101 that inputs an image of a person's face, an operating unit 102 by which the user inputs data and various instructions, a memory 103 that stores the program executed by the controller 100 and information necessary for the controller to execute the program, an output unit 104 that outputs an image, and an external storage device 105.

The controller 100 comprises a central processing unit (CPU), and controls the entire resolution converting device. The image input unit 101 comprises an image scanner. It has a line-type CCD (Charge Coupled Device) sensor, reads a photograph or other representation of a person's face, and outputs two-dimensional face image data. A digital camera that can capture the image of a person's face and output a two-dimensional image may be used instead. The controller 100 may further comprise an input terminal enabling connection to an external image scanner or digital camera.

The memory 103 comprises a read-only memory (ROM) in which the program executed by the controller 100 is stored, a random access memory (RAM) in which variables, etc. necessary for the controller 100 to execute the program are temporarily stored, and a hard disk in which various items of data are stored.

The output unit 104 comprises a display monitor such as a Braun tube or liquid crystal display device on which to display the image input by the image input unit 101 or the image obtained following image processing such as resolution conversion. A printer may also be used together with the display. The operating unit comprises a keyboard and a pointing device such as a mouse.

The external storage device 105 comprises an optomagnetic disk drive or digital video disk drive to read the program stored in the recording medium 106 and executed by the controller 100, or to read two-dimensional face image data. The data regarding the face image obtained through resolution conversion carried out by the controller 100 may also be written to the external storage device 105.

For the recording medium 106, tape media such as a magnetic tape or cassette tape, disk media such as a magnetic disk (flexible disk, hard disk) or an optical disk (CD-ROM, MO, MD, DVD), card media such as an IC card (including memory card) or an optical card, or media that carry programs in a fixed fashion, such as a masked ROM, an EPROM, an EEPROM or a semiconductor memory, i.e., a flash memory, may be used. It may also comprise a medium that carries programs in an intangible form, such as where a program is downloaded from a network. The external storage device handles the recording medium 106 such that information may be read from or written to such a recording medium 106.

Figure 2:
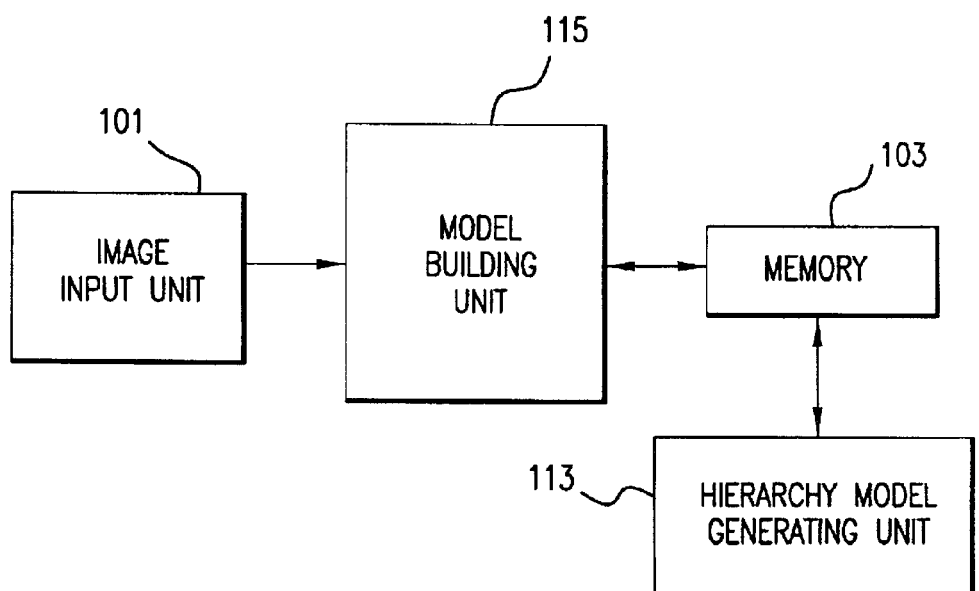
FIG. 2 is a flow chart showing the outline of the model building feature of the resolution converting device pertaining to the embodiment.

FIG. 2 is a functional block diagram showing the outline of the model building feature of the resolution converting device of this embodiment. The resolution converting device includes a model building unit 115 that generates a model expressed by base vectors sought by performing principal component analysis based on the characteristic data of the images input by the image input unit 101, and a hierarchy model generating unit 113 that generates models having different resolutions using the model generated by the model building unit 115.

The model generated by the model building unit 115 is defined by eigen vectors for the bases. The eigen vectors for the bases that comprise the model and the eigen vectors for the bases that comprise the models generated by the hierarchy model generating unit 113 are stored in the memory 103. The face images input by the image input unit 101 and used for the generation of a model are stored in the memory 103 together with the characteristic parameters obtained using that model.

The model building unit 115 performs principal component analysis of the multiple face images input by the image input unit 101 using the characteristic data pertaining to the input images. The characteristic data includes, for example, the coordinate and pixel value for each pixel. Therefore, if the resolution is high, the quantity of characteristic data increases. The normal orthogonal coordinate system sought as a result of the principal component analysis is stored in the memory 103 as a model. The image data input by the image input unit 101, the characteristic data that corresponds to each set of image data, and the characteristic parameters obtained using the model, are stored in the memory 103 in a linked fashion, although this step may be unnecessary.

Figure 3:
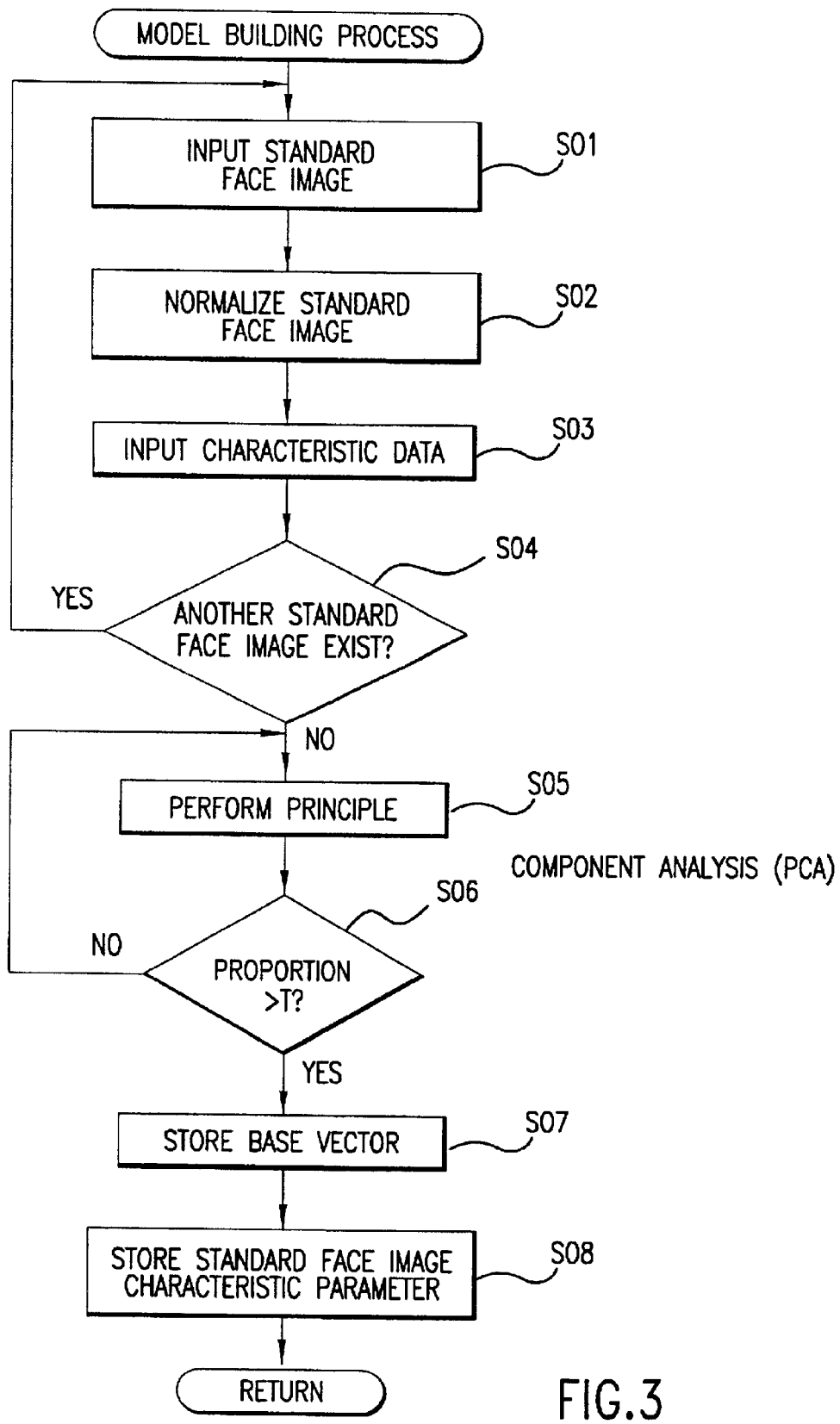
FIG. 3 is a flow chart showing the sequence of the model building process performed by the resolution converting device pertaining to the embodiment.

FIG. 3 is a flow chart showing the sequence of the model building process performed by the resolution converting device of this embodiment. With reference to FIG. 3, a standard face image is input by the image input unit 101 (step S01). Here, 'standard face image' comprises a face image used to enable the model building unit 115 to build a model. Multiple standard face images are available.

The standard face image input by the image input unit 101 is then normalized (step S02). 'Normalization' means matching of the input standard face image to a prescribed standard size. Specifically, this is accomplished by matching the distance between the eyes of the face image to a prescribed value. Here, in normalization, however, the standard face image is reduced only, and is not enlarged. It is preferred that all standard face images have the same resolutions.

The coordinate and density value of each pixel is input as characteristic data regarding the standard image input by the image input unit 101 (step S03).

In step S04, it is determined whether or not another standard face image to input exists. This determination is made based on the signal input by the user via the operating unit 102. Where there is another standard face image to input, the processes of the above steps S01 through S03 are repeated with regard to the newly input standard face image. Where there are no other face images to input, the process advances to step S05. By performing the processes of steps S01 through S03 on multiple standard face images, characteristic data is input for each of the multiple standard face images.

In step S05, principal component analysis is performed with regard to all characteristic data for the standard face images input by the image input unit 101. Because principal component analysis is a public-domain statistical technique, explanation thereof will be omitted here. When the principal components are extracted in step S05, it is determined in step S06 whether or not the sum of the proportions thereof is larger than the threshold value T. Consequently, principal component analysis is repeated in step S05 until the sum of the proportions exceeds the threshold value T.

Where the sum of the proportions exceeds the threshold value T, the eigen vectors for the bases that represent the principal components are stored in the memory 103 in step S07. A model is built using the eigen vectors for the bases that are stored in the memory 103.

In the next step S09, the characteristic parameters of the model regarding the standard face images input in step S01 are sought, and the standard face images and the characteristic parameters are stored in the memory 103 in a linked fashion.

A model is generated from the standard face images, and a face image database including the data that associates the standard face images used to generate the model and the model's characteristic parameters is created. The standard face images may be derived from different persons' faces or from the same person's face. Where they are derived from the same person, the characteristic parameters representing the same person's face are distributed in clusters based on the differences in facial expression.

T. F. Cootes et al., "Active Appearance Models" and "In Burkhardt and Neumann, editors, Computer Vision—ECCV' 98", Vol. II, Frieburg, Germany, 1999 disclose models thus generated. Using the active appearance models (AAM) proposed by Cootes et al., the characteristic parameters of the input two-dimensional image may be obtained by projecting the input two-dimensional image onto a model. More specifically, using the input image and any given model parameter, the difference from the estimated model generated using the model is sought. The characteristic parameters of the image input are calculated at high speed through the learning in advance of the relationship between the thus sought difference and the change amount to eliminate the difference of the model parameters.

The eigen vector for each base that comprises the generated model can be undergone resolution conversion in the same manner that the input image is subjected to resolution conversion. The resolution-converted eigen vector for each base that comprises a model are used as a low-order model with a lower resolution. This is called model hierarchization.

In image hierarchization, generally, the image is subjected to Gaussian filtering, and is reduced by eliminating alternating pixels. This process is repeated several times, and reduced images in multiple hierarchical levels are created. The reduced images thus generated and comprising multiple hierarchical levels are together called a Gaussian pyramid.

Figure 4:
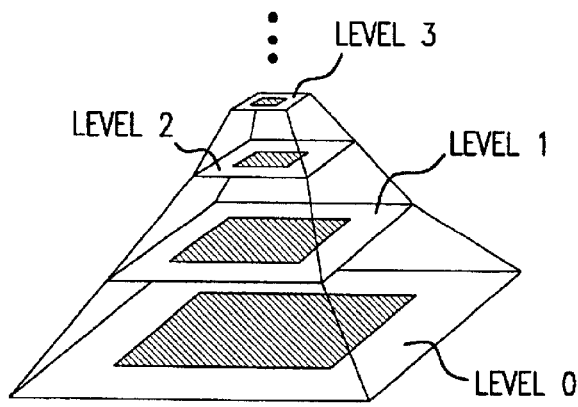
FIG. 4 is a drawing showing a Gaussian pyramid in a summary fashion.

FIG. 4 shows a Gaussian pyramid in a summary fashion. With reference to FIG. 4, the image resolution declines in the order from level 0 to level 3.

Model hierarchization, in contrast, may be achieved in the following manner. The relationship involving the bases obtained through principal component analysis, the characteristic parameters and the image may be expressed by the equation (1). In this case, the eigen vector for the base may be subjected to resolution conversion as in the case of image hierarchization.

In the same manner as in image hierarchization, the eigen vectors 0 through n that comprise the normal orthogonal bases are subjected to filtering via a Gaussian filter, some of the eigen vector components are eliminated, and hierarchized normal orthogonal bases are created. In this case, while there is a reduction in the eigen vector components, the number of eigen vectors itself does not change, and therefore, common characteristic parameters may be used for each hierarchical level. Therefore, the common characteristic parameters that were sought based on model hierarchization may be used for each model. If an image is generated using the same characteristic parameters and based on each model in the hierarchy, the generated images comprise a Gaussian pyramid that is obtained through the image hierarchization.

The equation (2) shows the relationship among the bases of a model generated through the hierarchization of the model expressed by the equation (1) and having a one-quarter resolution, the characteristic vector and the image vector.

As is clear from the comparison between the equations (2) and (1), there is no change in the number of dimensions in the characteristic vector. In contrast, the number of dimensions of the eigen vectors for the bases of each model is reduced to one-quarter of those present before the resolution conversion. At the same time, there is no change in the number of eigen vectors. The number of dimensions of the image vector is one-quarter of the number of dimensions prior to conversion.

by the image generating unit 157 and the image enlarged by the image enlarging unit 153, and an output unit 104 that outputs the synthesized image.

The memory 103 stores the model generated through the above model building process, and the multiple resolution-converted models obtained through the model hierarchization are stored as hierarchized models.

The face area extracting unit 151 extracts from the image input by the image input unit 101 the face area, in which the face is shown, transmits the face area image to the characteristic parameter calculating unit 155, and transmits the background image, which does not include the face area, to the image enlarging unit 153.

The characteristic parameter calculating unit 155 extracts a model that corresponds to the resolution of the face area image received from the face area extracting unit 151 from among the hierarchized models stored in the memory 103, and projects the face area image onto the extracted model. This projection is accomplished via the characteristic parameter calculation described above. In other words, the difference between the face area image and the model image generated based on a model using any given characteristic parameter is sought, the change amount for the characteristic parameters is sought based on the difference, and the characteristic parameters that correspond to the face area image are calculated based on the thus sought change amount.

$$\begin{pmatrix} g_0 \\ g_1 \\ g_2 \\ \vdots \\ g_m \end{pmatrix} = \begin{pmatrix} u_{00} & u_{10} & u_{20} & \cdots & u_{n0} \\ u_{01} & u_{11} & u_{21} & \cdots & u_{n1} \\ u_{02} & u_{12} & u_{22} & \cdots & u_{n2} \\ \vdots & \vdots & \vdots & & \vdots \\ u_{0m} & u_{1m} & u_{2m} & \cdots & u_{nm} \end{pmatrix} \begin{pmatrix} c_0 \\ c_1 \\ c_2 \\ \vdots \\ c_n \end{pmatrix} \quad (1)$$

↑ EIGENVECTOR 2  ↑ EIGENVECTOR n

↑ IMAGE VECTOR   ↑ CHARACTERISTIC PARAMETER

↓ ORTHONORMAL BASE $$\begin{pmatrix} g_0 \\ g_1 \\ g_2 \\ \vdots \\ g_{\frac{m}{4}} \end{pmatrix} = \begin{pmatrix} u_{00} & u_{10} & u_{20} & \cdots & u_{n0} \\ u_{01} & u_{11} & u_{21} & \cdots & u_{n1} \\ u_{02} & u_{12} & u_{22} & \cdots & u_{n2} \\ \vdots & \vdots & \vdots & & \vdots \\ u_{0\frac{m}{4}} & u_{1\frac{m}{4}} & u_{2\frac{m}{4}} & \cdots & u_{n\frac{m}{4}} \end{pmatrix} \begin{pmatrix} c_0 \\ c_1 \\ c_2 \\ \vdots \\ c_n \end{pmatrix} \quad (2)$$

Figure 5:
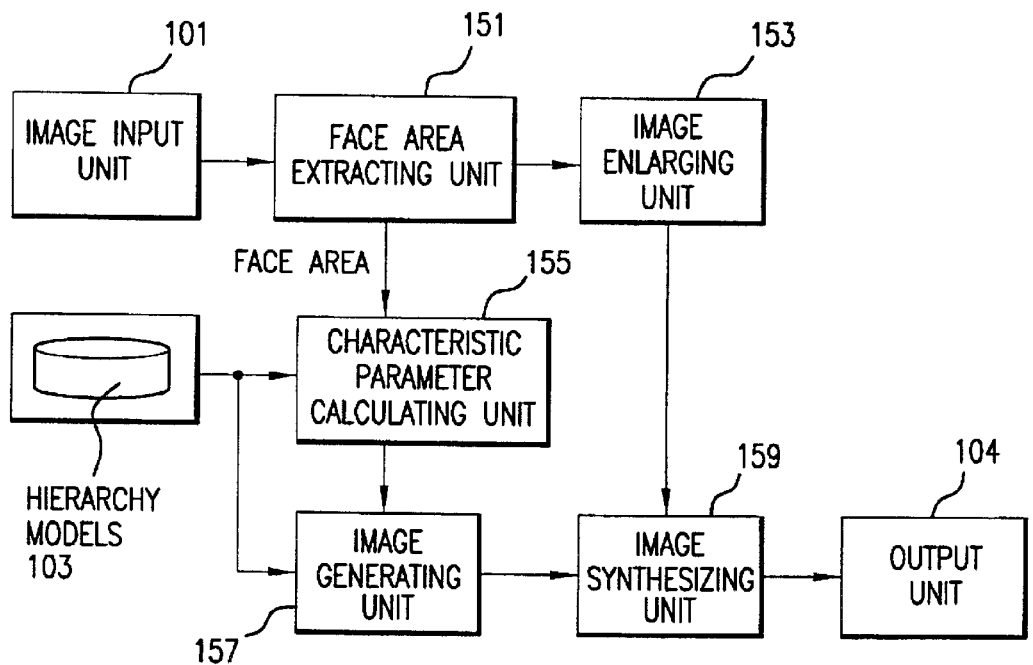
FIG. 5 is a functional block diagram showing the outline of the resolution conversion feature of the resolution converting device pertaining to the embodiment.

FIG. 5 is a block diagram showing in a summary fashion the resolution conversion feature of the resolution converting device of this embodiment. The resolution converting device includes a face area extracting unit 151 that extracts the face area, which shows the face, from the image input by the image input unit 101, an image enlarging unit 153 that (i) based on linear or tertiary interpolation, interpolates the background area, in which the background other than the face is shown, and (ii) enlarges the image, characteristic parameter calculating unit 155 that (i) projects the face area image extracted by the face area extracting unit 151 onto a model stored in the memory 103, and (ii) calculates the characteristic parameters, an image generating unit 157 that generates an image by applying the characteristic parameters sought by the characteristic parameter calculating unit 155 to a different model stored in the memory 103, an image synthesizing unit 159 that synthesizes the image generated The image enlarging unit 153 performs linear or tertiary interpolation of the background image received from the face area extracting unit 151 in order to enlarge the background image.

The image generating unit 157 extracts a model expressed using the desired resolution from among the hierarchized models stored in the memory 103, and generates an image by applying to the extracted model the characteristic parameters calculated by the characteristic parameter calculating unit 155. The resolution of the face image generated by the image generating unit 157 and the background image enlarged by the image enlarging unit 153 have the same resolution.

The image synthesizing unit 159 synthesizes the face area image generated by the image generating unit 157 and the background image enlarged by the image enlarging unit 153.

The synthesized image is output to the output unit 104 and is displayed on the display monitor or printed by the printer.

Figure 6:
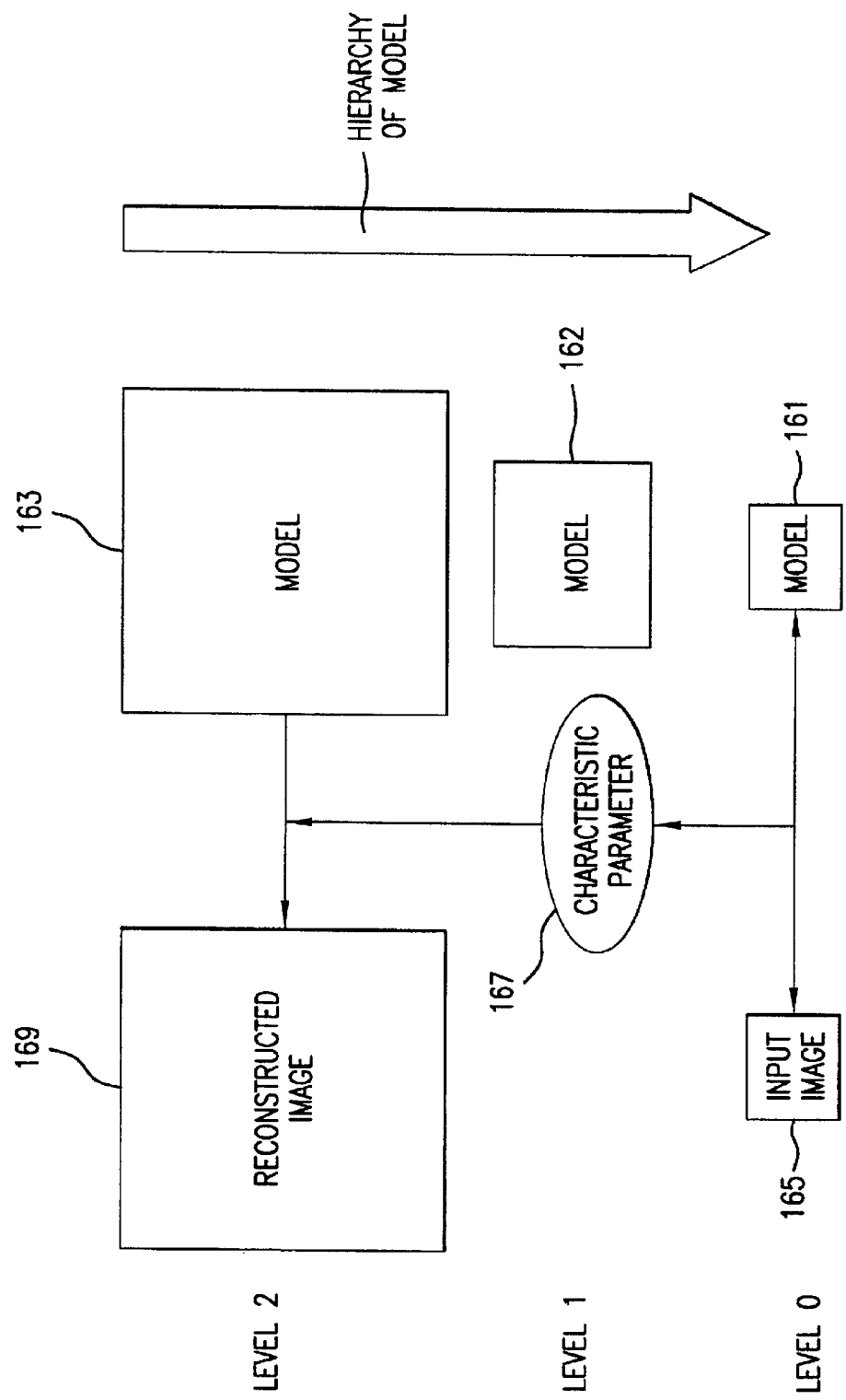
FIG. 6 is a drawing showing in a summary fashion the resolution conversion process performed by the resolution converting device pertaining to the embodiment.

FIG. 6 shows in a summary fashion the resolution conversion process performed by the resolution converting device of this embodiment. With reference to FIG. 6, the hierarchized models include a model 161, a model 162 having a higher resolution than the model 161, and a model 163 having a higher resolution than the model 162. The model 161 has a resolution level 0, the model 162 has a resolution level 1, and the model 163 has a resolution level 2. The resolution of the model 163 is four times as high as that of the model 162, and the resolution of the model 162 is four times as high as that of the model 161. In this case, the model 163 is generated via the model building process shown in FIG. 3. Through resolution conversion of the model 163, model hierarchization is accomplished, whereby the models 162 and 161 are obtained.

The model 161 that corresponds to the resolution of the input image 165 is extracted, and the input image 165 is projected onto the model 161. Based on this projection, the characteristic parameters 167 are sought. By generating an image based on the model 163 and using the characteristic parameters, the image 169 is generated. As a result, the resolution of the image 169 is 16 times higher than that of the input image 165. The resolution of the image generated based on the model 162 and using the characteristic parameters 167 is four times higher than that of the input image 165.

Figure 7:
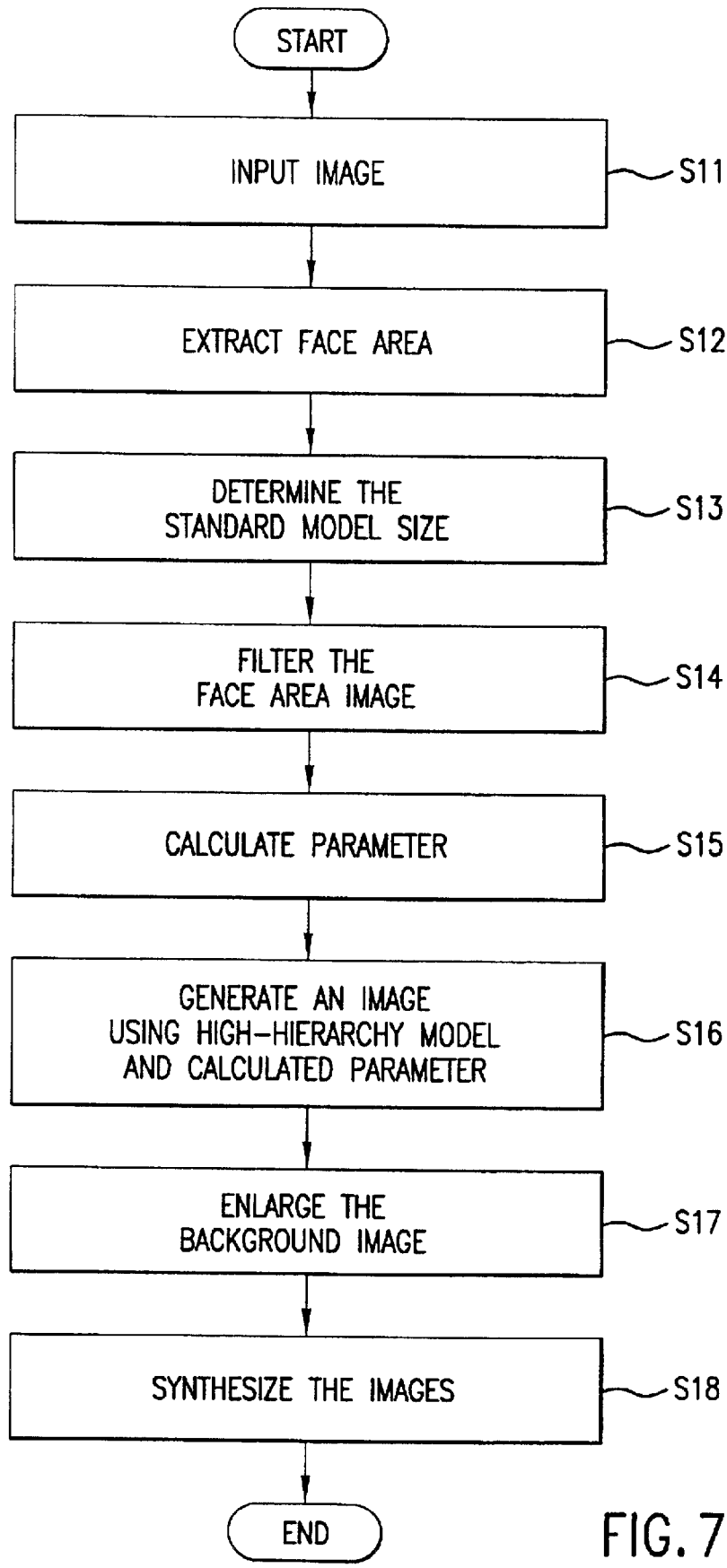
FIG. 7 is a flow chart showing the sequence of the resolution conversion process performed by the resolution converting device pertaining to the embodiment.

FIG. 7 is a flow chart showing the sequence of the resolution conversion process performed by the resolution converting device of this embodiment. With reference to FIG. 7, in the resolution converting device, an image is input by the image input unit 101 (step S11). The image of the face area is then extracted from the input image by the face area extracting unit 151 (step S12).

The standard model size that corresponds to the face area image is determined (step S13). 'Model size' means the size of a model that corresponds to the resolution of the face area image, which is selected from among the hierarchized models stored in the memory 103. Hierarchized models are hierarchized based on their resolutions, as described above. The resolution of each model of the hierarchy corresponds to the resolution of an image. Therefore, in step S13, based on the resolution of the face area image, a model that corresponds to that resolution is selected from among the hierarchized models. The model that corresponds to the resolution of the face area image comprises a model that has a resolution that is smaller than the resolution of the face area image but is closest to the face area image resolution.

In step S14, the face area image is filtered. Here, Gaussian filtering is performed in order to achieve harmonization with the model.

Characteristic parameters are then calculated by the characteristic parameter calculating unit 155, which projects the face area image onto the model selected in step S13.

In step S16, a higher-order model than the model selected in step S13 is extracted by the image generating unit 157, whereupon an image is generated. 'Higher-order model' means a model that has a higher resolution. The higher-order model extracted in this step is determined based on the magnification by which to enlarge the face area image. In other words, where the resolution is to be increased twice, a model having twice the resolution is extracted as a higher-order model. An image is then generated by applying the characteristic parameters calculated in step S15 to the higher-order model extracted.

The background image, which does not include the face area, is subjected to linear or tertiary interpolation (or wavelet) by the image enlarging unit 153 to convert the resolution (step S17). The resolution conversion in this step is based on the magnification by which the face area image is enlarged, as in the case of the extraction of a higher-order model in step S16. Therefore, the face area image and the background image have the same resolution.

In step S18, the face area image generated in step S16 and the background image, which has undergone resolution conversion in step S17, are synthesized and output to the output unit 104.

In this embodiment, resolution conversion pertaining to a face image was explained, but the present invention is not limited to this implementation, and may be applied to all types of objects.

As explained above, because the resolution converting device of this embodiment enlarges the input image using hierarchized models, a sharp image without blurriness may be generated. In addition, through the model hierarchization, the same characteristic parameters may be commonly used throughout all models of the hierarchy. Therefore, simply by obtaining the characteristic parameters of one model for one image, the obtained characteristic parameters may be commonly used with regard to other models in the hierarchy, so that the resolution of an image may be easily converted.

The processing performed by the resolution converting device of this embodiment is described in terms of a program, and the same feature as the resolution conversion process described above may be attained by having a computer carry out the program.

The embodiment disclosed herein is merely an example in terms of all aspects, and is not restrictive. The scope of the present invention is indicated by the claims, not by the explanation provided above, and all modifications equivalent to and within the scope of the claims are included.

What is claimed is:

1. A computer-readable medium having stored thereon a plurality of sequences of instructions for converting a resolution based on a plurality of models which have a different resolution respectively, the plurality of sequences of instructions including sequences of instructions, which, when executed by a processor, cause the processor to perform the steps of:

receiving an input image having a first resolution;

applying the input image to a first model having a first model resolution which corresponds to the resolution of the input image;

calculating a characteristic parameter of the input image;

applying the calculated characteristic parameter to a second model which has a second model resolution, the second model resolution being higher than the first model resolution; and generating an output image having a second resolution which corresponds to the second model resolution and is higher than the first resolution.

2. The computer-readable recording medium according to claim 1, further comprising preparing a plurality of models using a standard image.

3. The computer-readable recording medium according to claim 1, further comprising a step of preparing the second model through statistical processing from the first model.

4. The computer-readable recording medium according to claim 3, wherein the statistical processing is principal component analysis.

5. The computer-readable recording medium according to claim 3, wherein the first model represent a matrix of eigen vector values.

6. The computer-readable recording medium according to claim 3, wherein the second model is prepared by converting the first model resolution.

7. The computer-readable recording medium according to claim 1, further comprising:

extracting a face area and a background area from the input image, wherein the input image becomes the face area;

converting a resolution of the background area; and synthesizing the resolution-converted background area and the input image.

8. A resolution converting device comprising:

a preparing portion preparing multiple models having different resolutions;

a receiving portion receiving an input image;

a calculating portion calculating a characteristic parameter of the input image by applying the input image to a first model having a resolution corresponding to the resolution of the input image; and an image generating portion generating an output image having a resolution higher than the resolution of the input image by applying the calculated characteristic parameter to a second model having a resolution higher than the resolution of the first model.

9. The resolution converting device according to claim 8, wherein the preparing portion prepares the multiple models using a standard image.

10. The resolution converting device according to claim 8, wherein the preparing portion prepares the second model through statistical processing from the first model.

11. The resolution converting device according to claim 10, wherein the statistical processing is principal component analysis.

12. The resolution converting device according to claim 10, wherein each of the multiple models represents a matrix of eigen vector values.

13. The resolution converting device according to claim 10, wherein the preparing portion prepares the multiple models by converting the resolution of the first model.

14. A resolution converting method comprising:

preparing multiple models having different resolutions;

receiving an input image;

detecting a resolution of the input image;

projecting the input image onto a first model selected in accordance with the detected resolution in order to obtain a characteristic parameter of the input image; and generating an image by applying the obtained characteristic parameter to a second model different from the first model used to obtain the characteristic parameter, wherein a resolution of the second model is higher than a resolution of the first model, and a resolution of the generated image is higher than a resolution of the input image.

15. The resolution converting method according to claim 14, wherein the step of preparing multiple models prepares the multiple models using standard images.

16. The resolution converting method according to claim 14, wherein the step of preparing multiple models prepares a resolution of a first model through statistical processing.

17. The resolution converting method according to claim 16, wherein the statistical processing is principal component analysis.

18. The resolution converting method according to claim 16, wherein each of the multiple models represents a matrix of eigen vector values.

19. The resolution converting method according to claim 16, wherein the step of preparing multiple models prepares the multiple models by converting the resolution of the first model.

20. The resolution converting method according to claim 14, further comprising:

extracting a face area and a background area from the input image, wherein the input image becomes the face area;

converting a resolution of the background area; and synthesizing the resolution-converted background area and the input image.

21. The computer-readable recording medium according to claim 1, further comprising preparing a plurality of models by reducing a resolution of a standard model.

* * * * *